(12) United States Patent
Lewis et al.

(10) Patent No.: US 6,292,945 B1
(45) Date of Patent: Sep. 25, 2001

(54) EJECTION RESTRAINT SYSTEMS FOR FLIGHT SUITS

(75) Inventors: Donald J. Lewis; Terry W. Merrifield, both of Scottsdale, AZ (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/644,160

(22) Filed: Aug. 22, 2000

Related U.S. Application Data

(60) Provisional application No. 60/151,868, filed on Aug. 31, 1999.

(51) Int. Cl.[7] .............................. B64D 10/00; A41D 13/08
(52) U.S. Cl. .............................. 2/2.14; 2/16; 244/122 AG
(58) Field of Search ............ 2/2.14, 16, 1; 244/122 AG, 244/122 B; 600/20

(56) References Cited

U.S. PATENT DOCUMENTS

| | | | |
|---|---|---|---|
| 2,940,701 | * | 6/1960 | Beem et al. . |
| 3,074,669 | * | 1/1963 | Bohlin . |
| 3,202,384 | * | 8/1965 | Martin . |
| 3,329,464 | * | 7/1967 | Barwood et al. . |
| 3,502,073 | * | 3/1970 | Stanley . |
| 3,957,231 | * | 5/1976 | Miller et al. . |
| 4,462,563 | * | 7/1984 | Specker et al. . |
| 4,482,112 | * | 11/1984 | Cummings . |
| 5,072,897 | * | 12/1991 | Aronne . |
| 5,970,517 | * | 10/1999 | Jordan . |
| 6,105,169 | * | 8/2000 | Colorado . |

* cited by examiner

Primary Examiner—Rodney M. Lindsey
(74) Attorney, Agent, or Firm—Jerry J. Holden

(57) ABSTRACT

A high tensile tape or cable is sewn into pockets in the arms of a flight suit. The pockets are closed over the tape or cable by a frangible thread. A non-frangible thread secures one end of the tape or cable to the wrist of the flight suit. The other end of the wire or cable is secured to a fastener that is adapted to connect to a ring member in the aircraft. The ring member is fastened to a tape or cable wound on a haul-back reel in the aircraft seat. Upon receipt of an ejection signal, the haul-back reel winds the tape or cable rupturing the frangible threads securing the pockets in the arms of the flight suit. The tape or cable pulls the arms up and against the chest of the air crewmember.

4 Claims, 2 Drawing Sheets

EJECTION RESTRAINT SYSTEMS FOR FLIGHT SUITS

CROSS REFERENCE TO RELATED PROVISIONAL APPLICATION

This non-provisional application claims the filing date of Provisional Application having Ser. No. 60/151,868 filed on Aug. 31, 1999, titled "Restraint Systems For Ejection Systems" incorporated herein by reference.

FIELD OF THE INVENTION

This invention relates to aircrew ejection in general and more particularly to a flight suit restraint system for securing the air crewmember safely in his aircraft seat during ejection.

BACKGROUND OF THE INVENTION

Of major concern when a fighter aircraft is disabled in the air, is ejecting the crewmembers safely. In fighter aircraft, the air crewmembers initiate the process of ejection by pulling on an ejection handle, squeezing an ejection handle or some similar device to initiate ejection. The canopy that encloses the air crewmembers inside the aircraft cockpit is first blown or cut away. Next, the seat ejects out of the aircraft by a ballistic catapult along guide rails and the seat and air crewmember sitting thereon begins to enter the windblast. After the seat separates from the guide rails, it is propelled clear of the aircraft by rocket motors. When the seat reaches a safe trajectory, a parachute deploys for returning the air crewmember to the earth. The seat is stripped from the aircrew member and falls back to earth.

The proper positioning of the air crewmember in his seat is necessary for a safe ejection from the airplane. Such a positioning is requires that the air crew member is correctly aligned in his seat and that his arms and legs are safety stowed. Many factors affect positioning such as the attitude of the plane, is it flying straight, level and upright or is it in some other position?

A system identified as Inflatable Body and Head Restraint System, "IBAHRS" has been proposed which provides a pair of inflatables inside the vertical harness that extends from the five point rotary buckle to each shoulder. IBAHRS is a passive system that automatically tightens the harness at the onset of the crash. The inflatable pretensions the straps and forces the occupant back against the seat. This action lessens the chances of the air crew member from striking cockpit objects during the emergency.

However, in fixed wing aircraft, there are systems which use a net-like device that come out from the seat and tends to keep the arms and maybe the legs close to the body. In this way, when the air crewmember clears the aircraft, the windblast will not cause his limbs to flail. Around the ankles of the air crewmember are "garter-like" restraints that are tethered to the seat. During normal flying, the air crewmember's legs are free to move around, but during ejection, the tethers are pulled tight pulling the legs against the seat. Later when the air crewmember leaves the seat, the tethers are cut and the legs are no longer secured to the seat.

The location of the ejection handle, typically between the crewmember's legs, is designed so that as the air crewmember pulls the handle, this forces his arms against his/her chest.

SUMMARY OF THE INVENTION

It is a principal advantage of the ejection restraint system to position an air crewmember in his ejection seat before the ejection seat starts moving out of the airplane.

It is yet another advantage of the ejection restraint system to ensure that an air crewmember has his hands and arms securely and properly positioned during ejection to avoid or reduce injury to the air crewmember.

These and other advantages are found in an ejection restraint system for restraining an air crewmember in his seat during ejection from an aircraft. The system has a flight suit with a flexible tape having a high tensile strength sown into pockets in the arms of the flight suit. A non-frangible member secures one end of the tape at the wrist of the flight suit. A fastener member is secured to the other end of the tape. The pockets containing the tape are sewn together by frangible threads. The tapes are adapted to be responsive to an ejection signal for breaking the frangible threads from the pockets. The tapes pull each of the air crewmember's wrists upward toward his shoulders. [to a ring in the air crewmember's seat. A haul-back reel member located in the air crewmember's seat has a ring member for receiving the fastener member. A control unit, mounted on the seat, is responsive to an ejection signal for activating the haul-back reel. Activation of the haul-back reel pulls on the tape causing the arms to be pulled up across the chest of the air crewmember.

BRIEF DESCRIPTION OF THE DRAWINGS

These and other advantages will become apparent from the detailed description and the following drawings in which.

DETAILED DESCRIPTION OF THE PREFERRED EMBODIMENTS

Figure 1:
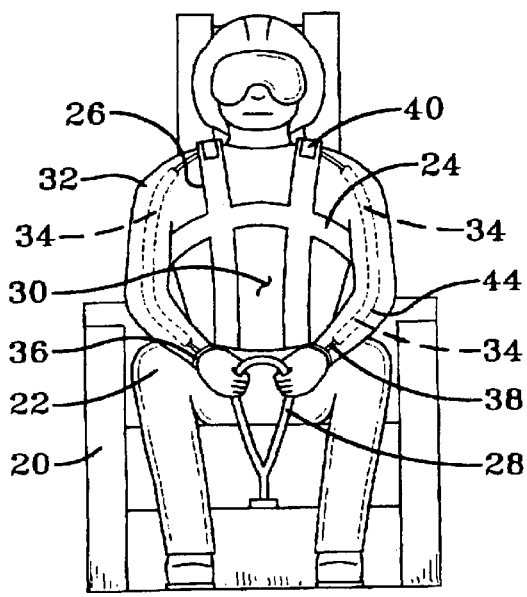
FIG. 1 is a front view of an air crewmember in an ejection seat.

Referring to FIG. 1 there is illustrated an air crewmember 22 in an aircraft seat 20. In this Fig., the air crewmember 22 is secured to the seat by various belts and harnesses such as chest harness 24, shoulder harness 26, collectively hereinafter called harnesses. It is the function of such harnesses to keep the air crewmember 22 in the seat and to prevent him/her from hitting various equipment in the cockpit during normal flying maneuvers. The harnesses allow the air crewmember 22 to move his body while operating the aircraft.

The air crewmember 22 has to eject from the aircraft when there is a failure in one or more of its mechanisms. The air crewmember 22 pulls on the ejection handle 28 or activates some other ejection device generating an ejection signal. Other such ejection devices are actuating levers or handles on the armrests of the aircraft seat. From that moment on, the control systems in the plane and on the aircraft seat 20, respond to the ejection signal to prepare the air crewmember 22 to be ejected from the aircraft. The canopy is removed, and various propelling devices such as rockets move the aircraft seat 20 out of the aircraft along one or more rails. After clearing the aircraft, a parachute deploys, the air crewmember 22 is separated from his seat 20 and the air crewmember descends safely to the ground.

Figure 8:
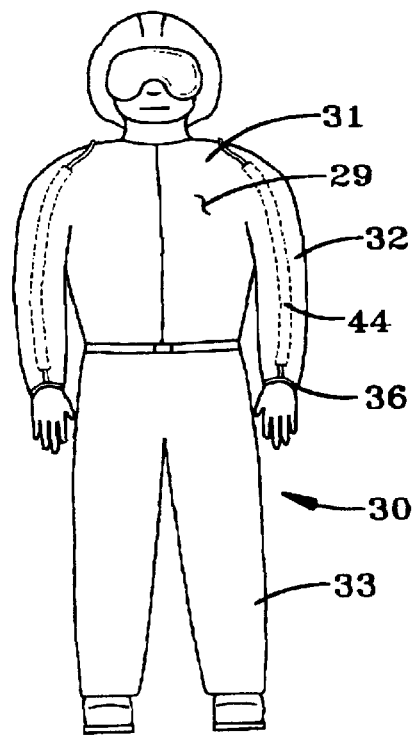
FIG. 8 illustrates a flight suit.

The preferred embodiments of the flight suit, as illustrated in FIG. 8, of the present invention operate to protect the crewmember 22 during ejection. Located in the air crewmember's flight suit 30 and along the arms 32 is a flexible tape or cable member 34 secured to the flight suit wristband 36 at one end 38. At the other end 40 of the tape 34 connects by a non-frangible member or thread 48 to a fastener or ring 41. This ring 41 is similar to that the air crewmember 22 hooks his shoulder harness 26.

Figure 2:
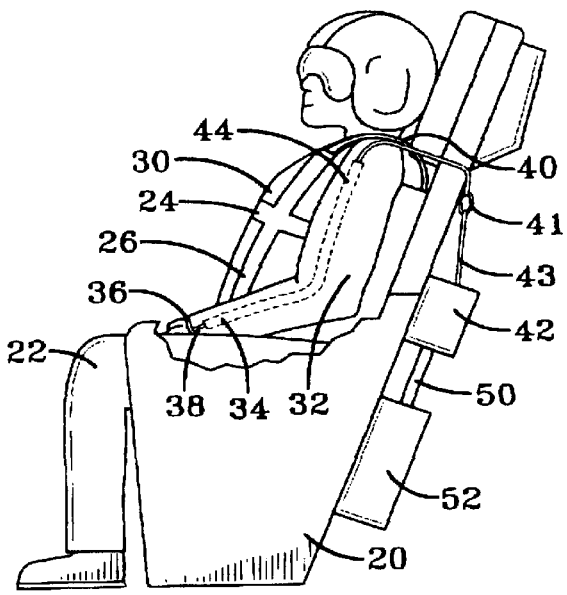
FIG. 2 is a side view of FIG. 1.

The fastener 41 connects by a webbing or cable 43 to a haul-back reel 42 that is located in or on the back of the aircraft seat 22. The operation of the haul back reel 42 is well known both in aircraft seats and in automotive seats to pull on the shoulder harnesses or the seat belt webbing under the operation of a control unit 52 such as that shown in FIG. 2. Such a control unit causes the reel to rewind or tighten the harnesses or webbing. When the ejection sequence begins, the haul-back reel 42 is actuated pulling on the shoulder harness 26. In addition, the haul-back reel 42 also pulls the tape 34. In order to accomplish the difference in the length of the length of the tape 34 and the length of the shoulder harness 26 that has to be hauled back, the haul-back reel 42 is modified. If the main haul-back reel 42 is not modified, a second haul-back reel may be secured to the first haul-back reel 42 and designed to accomplish the purpose of the ejection restraint system for flight suits.

FIG. 8 illustrates the flight suit 30 having a body portion 29 extending from the neck of the aircrew member 22 to his or her shoes 35. A shoulder portion 31 is a part of the body portion and fits over the shoulders of the aircrew member 22. The two arm 32 portions of the flight suit extend from the shoulder portion and each terminates in the wristbands 36 around the wrist of the aircrew member.

Figure 5:
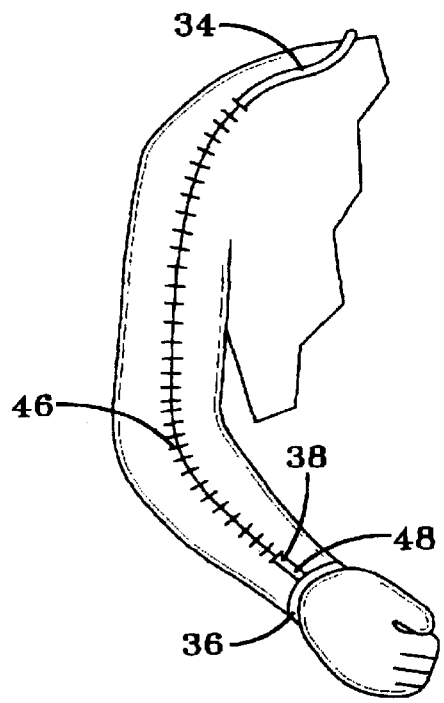
FIG. 5 is an enlarged view of the arm showing the frangible threads on the pockets.

The tape 34, which is typically of KELVAR material because it is flat and very thin for its strength, is stored in pockets 44 along the arms 32 of the air crewmember 22 as shown in FIG. 5. The tape 34 has a very high tensile strength. The pockets 44 are closed by a frangible member or thread 46. One end of the pockets 44 is intermediate the elbow and the shoulder and the other end of the pockets 44 is proximate the flight suit wristband 36.

Figure 3:
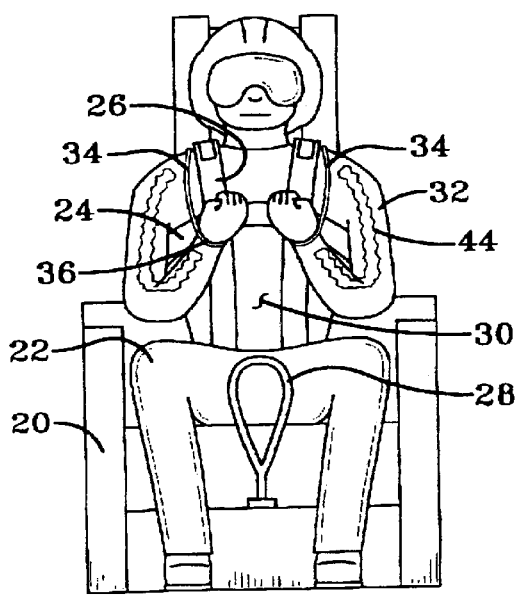
FIG. 3 is a front view of an air crewmember with his hands pulled up in front of his chest.
Figure 4:
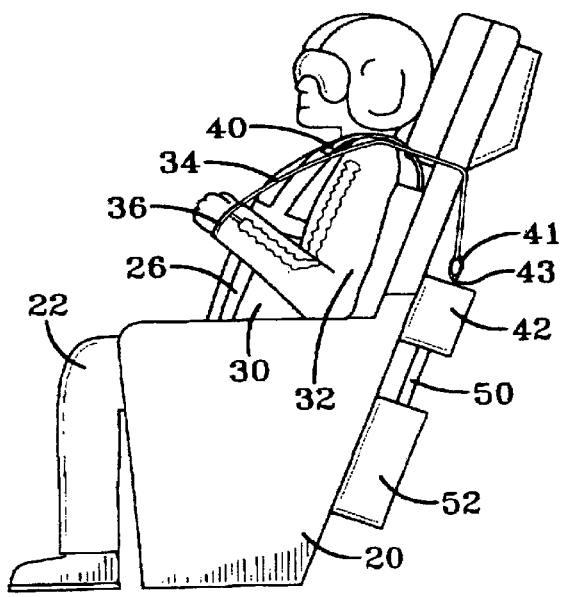
FIG. 4 is a side view of FIG. 3.
Figure 6:
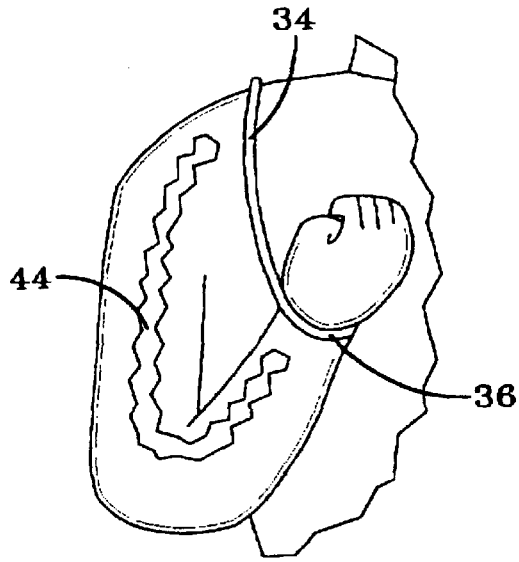
FIG. 6 illustrates the pockets ruptured and the arm at the chest.
Figure 7:
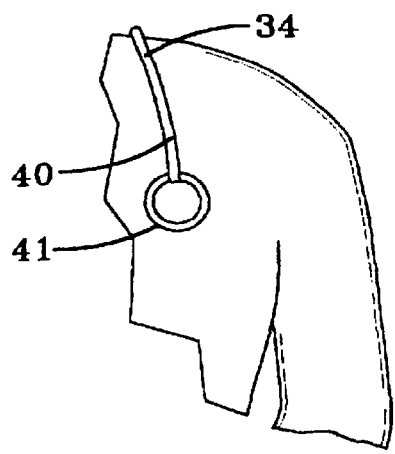
FIG. 7 illustrates the fastening ring connected to the tape.

As the air crewmember 22 pulls on the ejection handle 28, his hands move approximately six inches. The hands are stopped in their movement, by the ejection handle 28 reaching its stop. The movement of the ejection handle causes an ejection signal to be generated in a control unit. A control line 50 from a control unit 52 activates the haul-back reel 42. The haul-back reel 42 pulls on the shoulder harness 26, pulling the air crewmember 22 back into the aircraft seat 20. Since the tape 34 operates with the haul-back reel 42, the tape 34 starts pulling the arms 32 up and back against the chest of the air crewmember 22. As the haul-back reel 42 takes up the tape, the tape 34 pulls out of the pockets 44 in the arms of the flight suit 30. The pockets 44 rupture open due to breaking the frangible threads 46 sewing the pockets closed. This forcibly pulls the hands off the ejection handle 26 as shown in FIGS. 3, 4 and 6.

In the place of the tape 34, a small diameter cable having a high tensile strength can be used. Regardless of whether tape or a cable is used, the added thickness to the flight suit 30 is not apparent. The air crewmember 22 can continue to perform his/her functions during normal flight and at the beginning of ejection.

Once the ejection handle 28 is pulled, the hands are pulled off the ejection handle by the tape 34. The hands assume a position in front of the chest and close together. This is illustrated in FIG. 6. In fact, depending on the design criteria, the hands may be pulled by the tape so as to place the hands at the throat of the air crewmember 22.

The tape or cable member 34 will hold the arms in this position until the aircraft seat 20 separates from the air crewmember 22. This is at a time that is sometime after two hundred milliseconds after the start of the ejection.

There has thus been illustrated and described high tensile tape or cable is sewn into pockets in the arms of a flight suit. The pockets are closed over the tape or cable by a frangible thread. A non-frangible thread secures one end of the tape or cable to the wrist of the flight suit. The other end of the wire or cable is secured to a fastener that is adapted to connect to a ring member in the aircraft. The ring member is fastened to a tape or cable wound on a haul-back reel in the aircraft seat. Upon receipt of an ejection signal, the haul-back reel winds the tape or cable rupturing the frangible threads securing the pockets in the arms of the flight suit. The tape or cable pulls the arms up and against the chest of the air crewmember.

Accordingly, various changes and modifications may be made to the illustrative embodiment without departing from the spirit or scope of the invention. It is intended that the scope of the invention not be limited in any way to the illustrative embodiment shown and described but that the invention be limited only by claims appended hereto.

What is being claimed is:

1. An ejection restraint system in a flight suit for restraining an air crewmember in an aircraft seat during ejection, the flight suit having a shoulder portion for fitting over the shoulders of the air crewmember and arm portions for fitting over each arm of the air crewmember, each arm portion terminating in a wristband for location at the wrist of the air crewmember, said system comprising;

at least one pocket located on each arm portion and extending from adjacent the wristband to the shoulder portion;

two tapes each having a high tensile strength and two ends, one of said tapes enclosed in each of said pockets with one end of said tape being secured at the wristband and the other end extending from said pocket and over each shoulder portion;

a frangible thread for closing said pockets after enclosing said tapes therein; and a fastener connected to the other end of each of said tapes and adapted to be responsive to an ejection signal for pulling on said tapes breaking said frangible threads on said pockets pulling each of the wrists upward toward the shoulder portion of the air crewmember.

2. An ejection restraint system according to claim 1 wherein said tape is a small diameter wire cable having a very small cross sectional area.

3. A method for fabricating an ejection restraint system in a flight suit having a shoulder portion and two arm portions terminating in a wristband, the method comprising the steps of:

forming at least one pocket in each arm portion extending from adjacent the wristband to the shoulder portion;

securing a high tensile strength thin tape;

forming the tape into at least two lengths;

attaching a fastener to one end of the two ends of each tape;

attaching the other end of each tape to each wristband of the flight suit respectively;

placing the tape in at least one pocket running the length in each of the flight suit arms, from the wrist band to the shoulder portion with the tape extending over the shoulder portion and the fastener extending beyond the shoulder portion; and then closing the pockets with a frangible thread.

4. A flight suit for an air crew member for restraining the arms of an air crewmember in an aircraft seat during ejection, said flight suit comprising:

a body portion for enclosing the aircrew member having a leg portion, shoulder portion for fitting over the shoulders of the air crewmember and arm portions for fitting over each arm of the air crewmember, each arm portion terminating in a wrist band for location at the wrist of the air crewmember;

at least one pocket located on each arm portion and extending from adjacent said wrist band to said shoulder portion;

two tapes each having a high tensile strength and two ends, one of said tapes enclosed in each of said pockets with one end of said tape being secured at said wrist band and the other end extending from said pocket and over each shoulder portion;

a frangible thread for closing said pockets after enclosing said tapes therein; and a member connected to the other end of each of said tapes and responsive to an ejection signal for pulling on said tapes for breaking said frangible threads on said pockets pulling each of the wrists upward toward said shoulder portion.

* * * * *